No. 878,042. PATENTED FEB. 4, 1908.
W. CHESTERMAN.
NUT LOCK.
APPLICATION FILED JAN. 17, 1907.
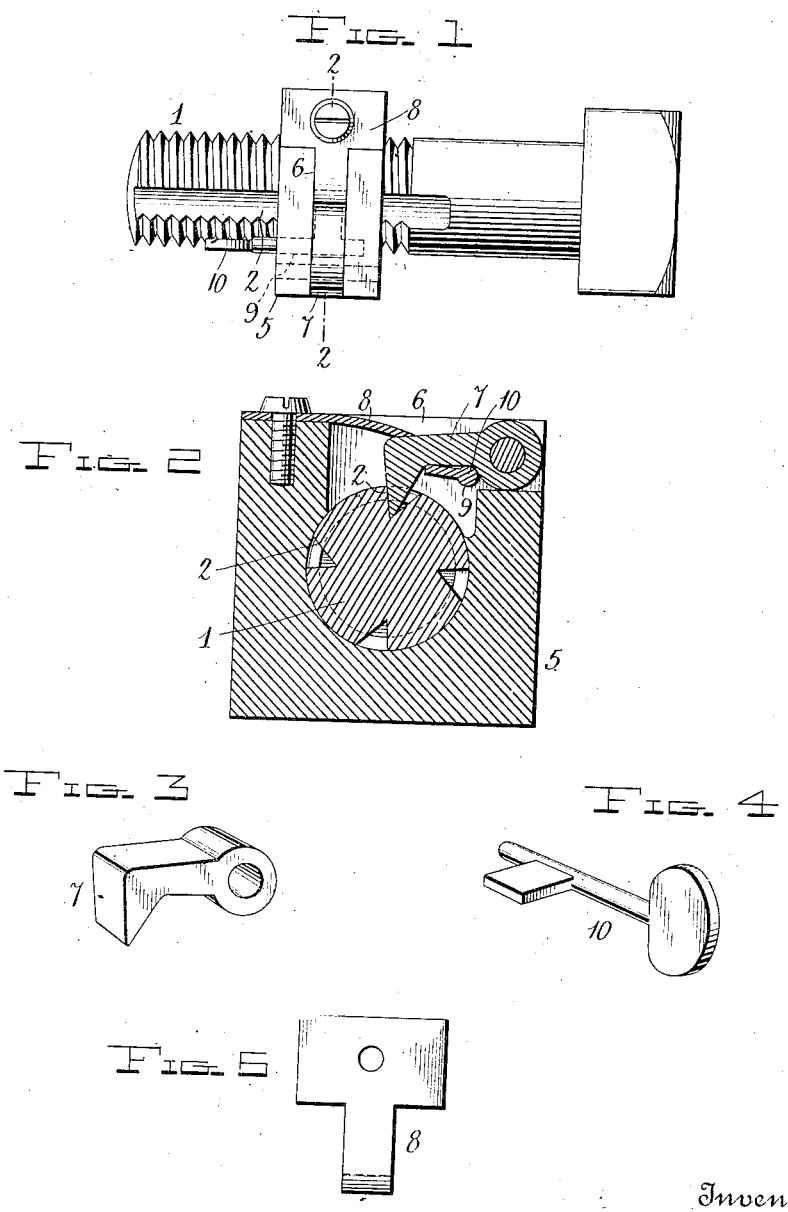
Witnesses
Inventor
William Chesterman
by
Attorneys

UNITED STATES PATENT OFFICE.

WILLIAM CHESTERMAN, OF WALSTON, PENNSYLVANIA, ASSIGNOR OF ONE-FOURTH TO D. SMILEY, ONE-FOURTH TO L. B. BUTERBAUGH, AND ONE-FOURTH TO D. W. RICHARDS, OF WALSTON, PENNSYLVANIA.

NUT-LOCK.

No. 878,042.　　　　Specification of Letters Patent.　　　　Patented Feb. 4, 1908.

Application filed January 17, 1907. Serial No. 352,754.

*To all whom it may concern:*

Be it known that I, WILLIAM CHESTERMAN, a citizen of the United States, residing at Walston, in the county of Jefferson and State of Pennsylvania, have invented certain new and useful Improvements in Nut-Locks; and I do declare the following to be a full, clear, and exact description of the invention, such as will enable others skilled in the art to which it appertains to make and use the same.

This invention relates to an improved nut lock.

The object of the invention is to provide a simple and efficient nut lock which will hold the nut in adjusted position until released by a key.

In the accompanying drawings, Figure 1 represents a side elevation of a bolt with a nut provided with this improved lock applied thereto; Fig. 2 represents a section taken on the line 2—2 of Fig. 1; Fig. 3 represents a detail perspective view of the pawl; Fig. 4 represents a perspective view of the releasing key; and Fig. 5 represents a top plan view of the spring detached.

In the embodiment herein illustrated, a bolt 1 of ordinary construction is provided with angular grooves, as 2, extending longitudinally through its threaded portion, said grooves being of substantially V-shape in cross section and each presenting a straight and a rearwardly inclined wall. A nut 5 of ordinary construction has a recess or slot 6 extending through one side wall thereof. Said recess or slot 6 terminates near one corner of the nut at one end, and has an open end extending through another corner of the nut. In this recess 6, preferably at the open end, is pivoted a dog or pawl 7, the free end of which is provided with a substantially V-shaped engaging portion to seat in the longitudinal grooves in the bolt and prevent the backward turning of the nut, the rear face of said engaging portion being inclined to accord with and ride freely over the inclined walls of the grooves. The pivoted end of said pawl is cylindrical in shape and fits snugly against the sides and bottom of the slot or recess 6 and lies entirely within said recess or slot. Riveted to the nut 5 on the same edge having recess 6 and at the opposite corner from the dog 7 is a T-shaped flat spring 8, the free end of which extends into said recess 6 and bears on the dog 7 to hold it securely in engagement with the walls of the groove in the bolt. This spring 8 is preferably made T-shaped, as shown in Fig. 5, with its free end preferably beveled, as shown clearly in Fig. 2, to more closely engage the top of the dog 7 and hold it against backward movement. The spring and pawl, which are of a width equaling that of the recess, conjointly form a closure for the latter to prevent the entrance of dust or other foreign matters thereinto. The arms of said T-shaped spring fit snugly against the shoulders formed by a cut-away portion in the face of said nut, as shown, and lie flush with the wrench-receiving face of the nut. In one face of the nut, about midway thereof is a key-hole 9, which extends through into the recess 6 in which the dog is disposed. When it is desired to remove the nut from the bolt, a key 10 is inserted through the hole 9 and turned to lift the dog out of engagement with the groove 2 in the bolt 1, and the nut may then be unscrewed from the bolt and removed, it being held safely on the bolt until released by the person carrying the key whereby tampering with the nut and removal thereof is prevented except by the person authorized.

I claim as my invention:—

1. In a device of the class described, in combination, a bolt having a plurality of longitudinal grooves extending through its threaded portion, said grooves being substantially V-shaped and each comprising a radial and a rearwardly inclined wall, a nut having wrench-receiving faces and an internally threaded opening to receive the bolt and provided in one edge with a recess communicating with said opening and terminating in an open end at one corner of the nut and in a closed end near the adjacent corner, a locking pawl having a transversely disposed cylindrical end pivoted at the open end of said recess with said cylindrical end lying entirely within said recess and lying at all positions of movement in contact with the three adjacent walls of said recess, the free end of said pawl being provided with a pointed tooth adapted to fit in said V-shaped groove for locking the nut against retrograde movement, but adapted to slide freely over said grooves during a forward movement, shoulders on one of said wrench receiving faces and near the closed end of said recess and formed by a cut-away portion, a T- shaped leaf spring having arms adapted to fit said cut away portion and to be flush with the adjacent wrench - receiving faces, the body part of said spring closely fitting said recess and having a tapering beveled end adapted to press on said pawl and form a substantially unbroken surface therewith, said leaf spring and said pawl closely fitting said recess and forming a closure therefor, and a key-hole in the face of said nut adapted to receive a key for rotation directly under said pawl to unlock the same, the moving parts being arranged to lie at all times within the wrench receiving faces of the nut.

2. In a device of the class described, in combination, a bolt having a plurality of longitudinal grooves extending through its threaded portion, said grooves being substantially V-shaped in cross section and each presenting a straight and a rearwardly inclined wall, a nut having an opening internally threaded to receive the bolt and provided in one edge with a recess communicating with said opening and terminating in an open end at one corner of the nut and in a closed end near the adjacent corner, a locking pawl pivoted in said recess at one end and provided at its free end with a tooth to engage the V-shaped grooves for locking the nut against retrograde movement but adapted to slide freely over said grooves during a forward movement of the nut, shoulders in the wrench receiving face of the nut on each side of the closed end of said recess transverse thereto and formed by an offset in said face, a T-shaped leaf spring having broad arms adapted to lie in said offset portion and to be flush with said wrench-receiving face, said leaf spring also having a narrow body portion adapted to project into said recess and to bear upon the free end of said pawl, said pawl and the body portion of said pawl being of a width equaling that of said recess and jointly forming a closure therefor, and a key hole in the face of the nut adapted to receive a key for rotation immediately under the pawl to raise the same, the parts of the nut being so arranged that the movable parts remain within the plane of the wrench-receiving surfaces when the nut is rotated.

In testimony whereof I have hereunto set my hand in presence of two subscribing witnesses.

WILLIAM CHESTERMAN.

Witnesses:
C. J. McCartney,
W. W. McMillen.